US006042359A

United States Patent [19]

Costi et al.

[11] Patent Number: 6,042,359

[45] Date of Patent: Mar. 28, 2000

[54] CORRUGATING MACHINE

[75] Inventors: Albert Costi, Florence, Italy; Michel Buchy, Franqueville-St Pierre, France

[73] Assignee: Onduline, Paris, France

[21] Appl. No.: 08/968,428

[22] Filed: Nov. 12, 1997

[30] Foreign Application Priority Data

Nov. 12, 1996 [FR] France .................................. 96 13767

[51] Int. Cl.[7] .................................................... B29C 53/28

[52] U.S. Cl. .......................... 425/336; 425/369; 425/370

[58] Field of Search .................................... 425/369, 370, 425/336

[56] References Cited

U.S. PATENT DOCUMENTS

| | | | |
|---|---|---|---|
| 2,494,642 | 1/1950 | Case et al. | 425/370 |
| 2,723,708 | 11/1955 | Tefft | 425/370 |
| 2,882,955 | 4/1959 | Osbourne et al. | 425/370 |
| 3,157,551 | 11/1964 | Granozio | 425/370 |
| 4,498,944 | 2/1985 | Krause et al. | 425/336 |
| 5,858,418 | 1/1999 | Buchy | 425/369 |

FOREIGN PATENT DOCUMENTS

| | | | |
|---|---|---|---|
| 0 338 826 | 10/1989 | European Pat. Off. . | |
| 2162034 | 7/1973 | France . | |
| 2183705 | 12/1973 | France . | |
| 58-205732 | 11/1983 | Japan | 425/336 |
| 60-115332 | 6/1985 | Japan . | |
| 662421 | 12/1951 | United Kingdom . | |
| 2 036 823 | 7/1980 | United Kingdom . | |

OTHER PUBLICATIONS

Patent Abstracts of Japan, Abstract of Japanese Reference 60-115,332, dated Jun. 1985.

*Primary Examiner*—Robert Davis
*Attorney, Agent, or Firm*—Young & Thompson

[57] ABSTRACT

The invention consists of a corrugating machine comprising a plurality of corrugating bars (6) fixed to an endless chain (5) rotatably driven and a plurality of support bars (13) for the material to be corrugated (10) driven in translation and perpendicular to their direction of movement, a part (42) of the endless chain being opposite the plane of said support bars, the corrugating bars and the corresponding support bars interpenetrating one another, wherein the corrugating bars (6) are movable in translation with respect to the endless chain (5), their movements being made approximately perpendicular to the plane of the support bars, when they are opposite said plane.

11 Claims, 3 Drawing Sheets

CORRUGATING MACHINE

FIELD OF THE INVENTION

This invention relates to a machine for obtaining profiled materials, from sheets of a malleable material, such as, for example, moist cardboard or felt.

The profile of the material is generally of the sinusoidal type, flat areas possibly alternating with corrugations.

This material is used for producing covers and more particularly, under-roofs for roofs with arched or flat tiles.

BACKGROUND OF THE INVENTION

Machines are already known that permit the corrugation of sheets of flexible material, running in a continuous way, the corrugations being produced substantially perpendicular to the running direction of the sheets.

Hence, FR patent 2 079 499 describes a corrugating machine comprising two parallel shafts, rotatably driven in opposite directions. Carrier arms for corrugating bars are fixed onto these shafts, the bars being parallel to the shafts. In addition two endless belts are fitted to grip between them the sheet of flexible material and bring it to the point of maximum interpenetration of the corrugating bars.

When it is inserted between the corrugating bars of each shaft, the flexible sheet takes a corrugated shape, the depth of the corrugations depending on the spacing of the shafts.

One can also mention another type of corrugating device, in which the corrugating devices are carried by stirrup pieces rigidly fixed to an endless chain. The corrugating bars are thus driven by the endless chain which is, in part, parallel to the plane along which the sheets of flexible material are passing. These sheets are carried by spaced apart dryer bars which ensure that they pass along and which are perpendicular to their running direction.

The endless chain is driven by at least two shafts parallel to the dryer bars.

When a corrugating bar arrives opposite a sheet of flexible material, it is engaged in the empty space provided between two dryer bars. The corrugating bar stays in contact with the flexible sheet as long as it is parallel to the plane of the dryer, then, driven by the endless chain, it disengages itself from the dryer bars. The flexible sheet thus takes on a corrugated shape. The depth of the corrugations depends on the distance between the shafts driving the endless chain and the dryer bars.

Japanese Patent Application JP-60 115 332 is known which describes a machine for forming radiator fins. During the formation of these metal fins, heads carried on an endless belt come into contact with the flat strip of metal to form corrugations in it. During the contact, the heads are driven in a rotation movement with respect to the strip and several corrugations are simultaneously formed.

These corrugating devices have been used for numerous years and they have given satisfaction.

However, the design of known corrugating devices limits the depth of the corrugations. In effect, if the two systems of bars are too close to each other, they cannot penetrate one into the other either on engagement or on disengagement of the corrugating bars. The machine cannot operate.

In addition, experience has shown that with continuous running, the corrugations must be made one after another and not simultaneously, which limits the upper values of radii of curvature for the return parts of the chains.

Indeed, it appears to be necessary to provide profiled materials having corrugations that are relatively deep and close together. The resistance to bowing of such materials is increased compared with traditional profiled materials. This allows an increase in the strength of roofs in which they are used.

Furthermore, the materials with deep corrugations are better suited to laying tiles in certain applications.

A new corrugating machine has therefore been designed in order to provide materials having a profile of the sinusoidal type and, in particular a profile marked with deep corrugations.

SUMMARY OF THE INVENTION

Hence the invention relates to a corrugating machine comprising a plurality of corrugating bars fixed orthogonally to an endless chain rotatably driven and a plurality of bars to support the material to be corrugated, driven in translation and perpendicular to their direction of displacement, a part of the endless chain being opposite the plane of the support bars, the corrugating bars and the corresponding support bars interpenetrating one another.

According to the invention, the corrugating bars are movable in translation with respect to the endless chain, their movements being made approximately perpendicular to the plane of the support bars when they are opposite said plane.

Hence, when a corrugating bar arrives opposite the support bars, it is subjected to a translation movement perpendicular to the plane of the support bars and is driven between two support bars.

The depth of the corrugations depends on the amplitude of the translation movement, which is imparted to the corrugating bars.

It is only limited by the strength of the material to be corrugated which is generally constituted by a sheet of flexible material. In effect, even if a corrugating bar penetrates deeply between two support bars, it can easily be disengaged thanks to a translation movement, perpendicular to the plane of the bars supporting the material to be corrugated.

In addition, the machine allows the making of corrugations one after the other.

The following characteristics of the invention can also be taken into consideration, in accordance with any combination that is technically possible:

- the machine comprises a plurality of bars for supporting the support bars,
- these supporting bars are fixed to an endless chain, positioned under the plane of the support bars and rotatably driven,
- the support bars are the bars of the dryer chain,
- the corrugating bars are fixed orthogonally to the endless chain which is, in part, parallel to the plane of the support bars,
- in the part of the chain opposite the plane of the support bars, the machine comprises means for moving the corrugating bars between a high position in which the bars are not in contact with the material to be corrugated and a low position, in which the bars pass between two support bars,
- said means are made up of at least one cain which controls the movement of members linking the corrugating bars to the chain and which are movable in translation with respect to said chain,
- the machine comprises means for maintaining the corrugating bars in the low position, in the part of the chain opposite the plane of the support bars, the machine comprises holding rods, fixed to the chain and alternating with the corrugating bars, the cross section of the corrugating bars is matched to the profile sought for the corrugated material, the assembly of corrugating bars and, eventually, holding rods is movable with respect to the plane of the support bars and/or is interchangeable.

BRIEF DESCRIPTION OF THE DRAWINGS

The invention will be better understood and other aims, advantages and characteristics of it will more clearly be apparent on reading the description that follows and which is given in relation to the appended drawings which represent non-limitative embodiments of the invention and in which.

DETAILED DESCRIPTION OF THE PREFERRED EMBODIMENT

The elements common to the different figures will be designated by the same reference numbers.

Figure 1:
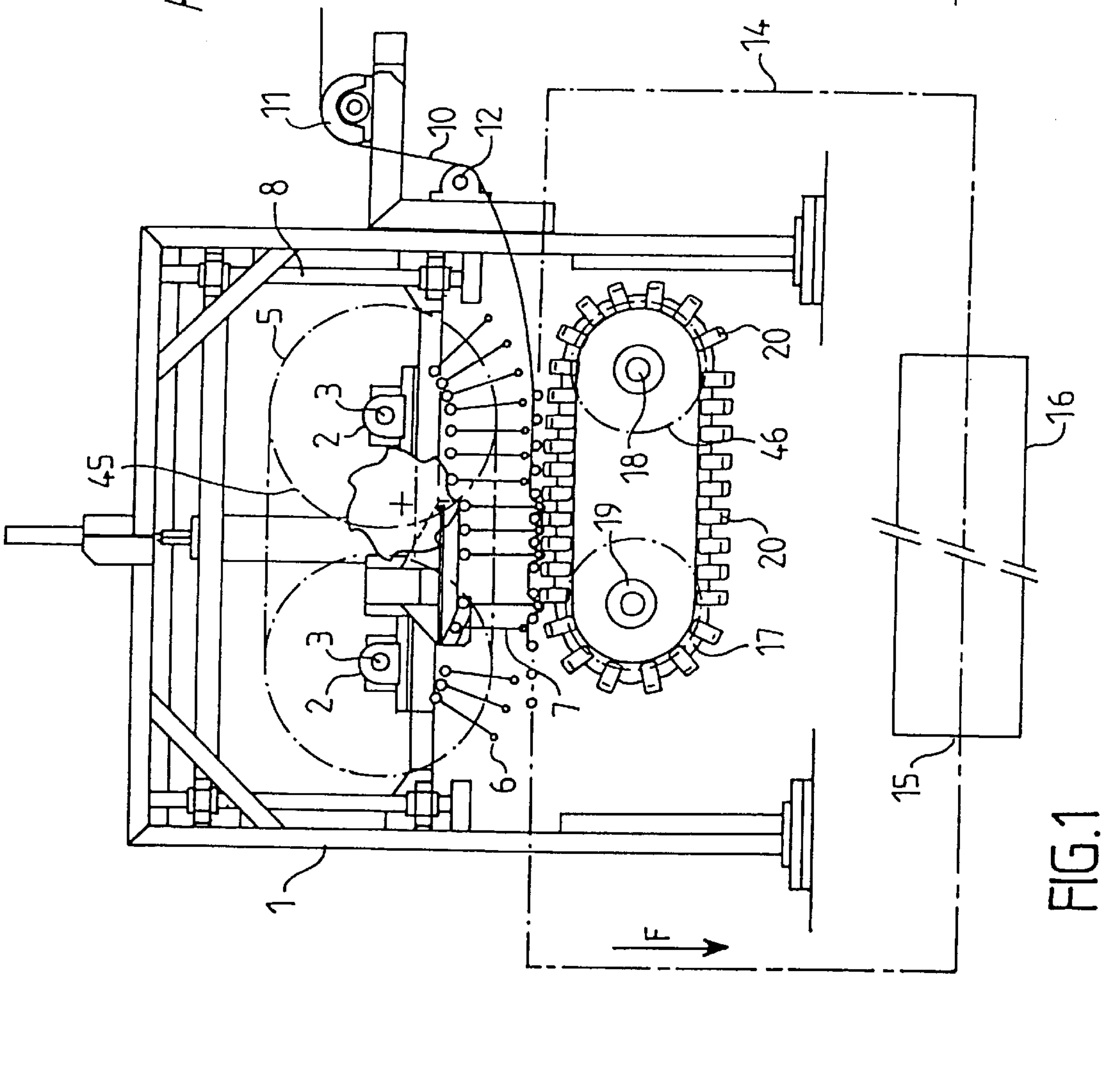
FIG. 1 represents a diagrammatic view of an example of the corrugating machine according to the invention, illustrating its principle of operation.

Referring to FIG. 1, the machine according to the invention comprises a frame 1 within which the corrugating bars 6 are mounted.

The material to be corrugated 10 comes from a system not shown on the Figure. It is guided by suitable means 11 and 12 onto the bars 13 of the dryer chain 14.

It is generally constituted by a sheet of malleable material such as moist cardboard or felt.

At the exit to the corrugating machine, the profiled material is lead to the entry to the drying tunnel 16. When it leaves the drying chamber, the profiled material is removed from the bars of the dryer. The direction of circulation of the material on the dryer chain 14 is shown by the arrow F.

The material might be carried by systems other than the bars of the dryer. The solution presented has the advantage of avoiding the manipulation of the wet profiled materials before they enter the dryer. This limits the risks of damage to the product and reduces handling costs.

Within the frame 1, two bearings 2 are mounted. A shaft 3, rotatably driven by a motor not represented in the Figure, passes through each of the bearings. The shafts 2 are parallel and rotatably drive an endless chain 5, by means of transmission units 45.

The corrugating bars 6 are fixed onto the chain by means of a support 7. They are movable in translation with respect to the plane of the chain, as will be described in greater detail with reference to FIG. 2.

Preferably, the assembly made up by the endless chain 5 and the corrugating bars 6 is fixed onto a sub-frame 8 itself fixed to the frame 1. The sub-frame is slidably mounted on slides.

This allows the distance between the corrugating bars 6 and the dryer bars 13 to be adjusted.

The assembly can also be completely removed and replaced by another, suitable for the manufacture of corrugated materials of a different profile.

Underneath the dryer bars, the corrugating machine preferably comprises another endless chain 17. This is rotatably driven by means of two shafts 18 supported by bearings 19, fixed onto the frame 1. The shafts 18 are parallel to the shafts 2.

Reinforcing bars 20 are fixed onto the chain 17 parallel to the dryer bars as will be described in more detail with reference to FIG. 5.

Figure 4:
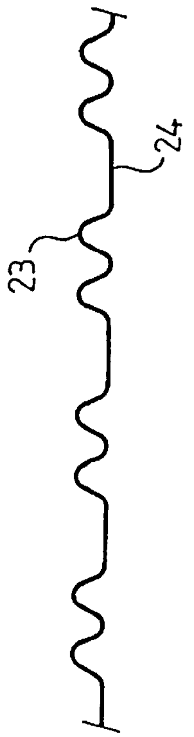
FIG. 4 illustrates an example of profiled material obtained with the machine according to the invention and FIG. 5 is a partial view in section of a preferred embodiment of the corrugating machine according to the invention.
Figure 2:
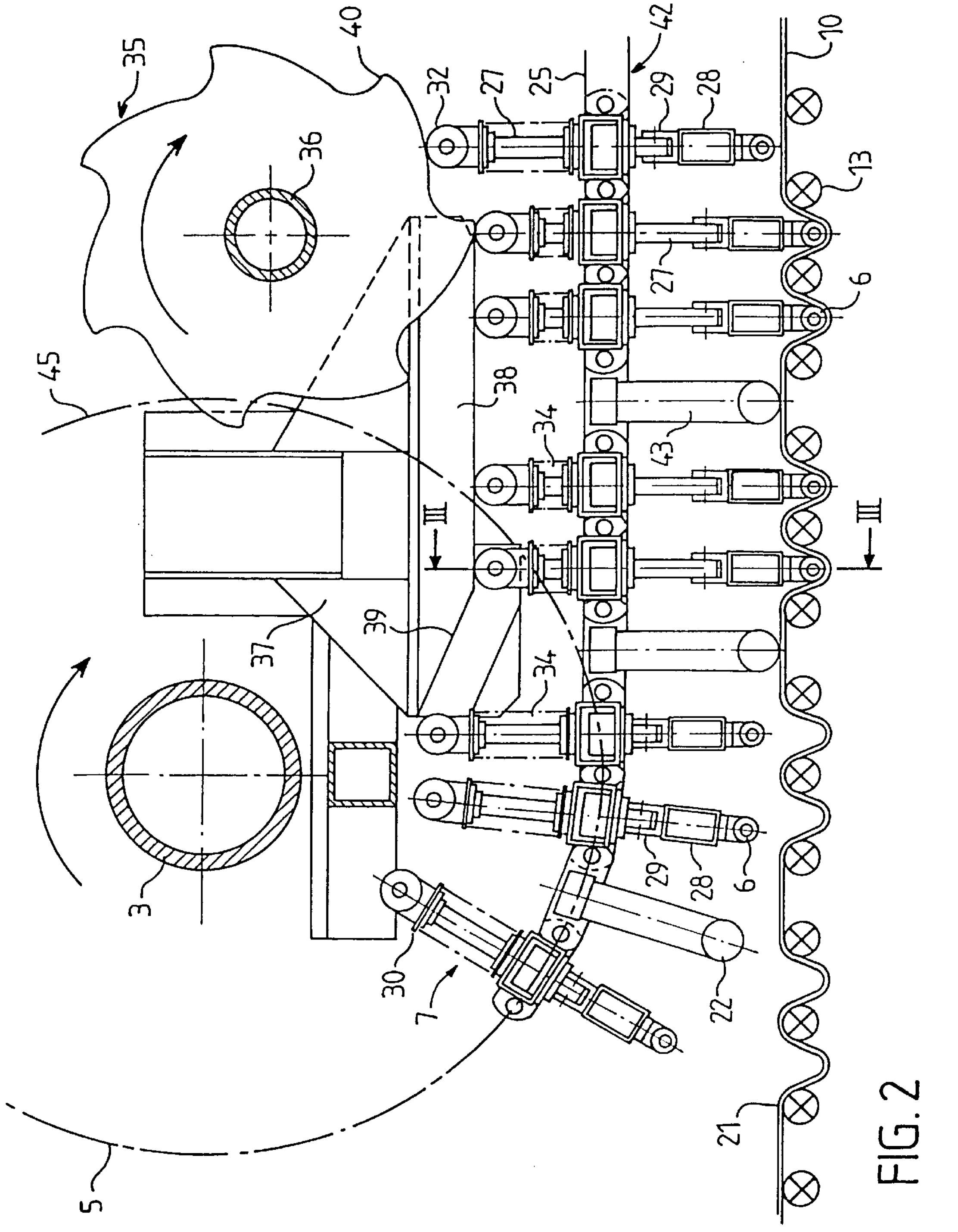
FIG. 2 is a partial view, in section of an embodiment example of a machine according to the invention, along a plane perpendicular to the corrugations formed

With reference to FIG. 2, the sheet 10 of material to be corrugated is supported by the bars 13 of the dryer chain. It is converted between the corrugating bars 6 and the bars 13. The material 21 which leaves the corrugating machine has a profile corresponding to the machine and to the setting of the corrugating bars. It is also illustrated in FIG. 4.

In the example illustrated in FIG. 2, the corrugating machine comprises, alternately, two corrugating bars 6 with a round section and a holding rod 22. As will be seen later, the holding rods allow flat areas to be formed. Hence the material 21 is made up of alternately two corrugations 23 and a flat area 24.

When the profiled material is used as an under-roof for a roof of arched tiles, the flat areas allow good fixing of the standard tiles or the covering tiles if the standard tiles are done away with.

Figure 3:
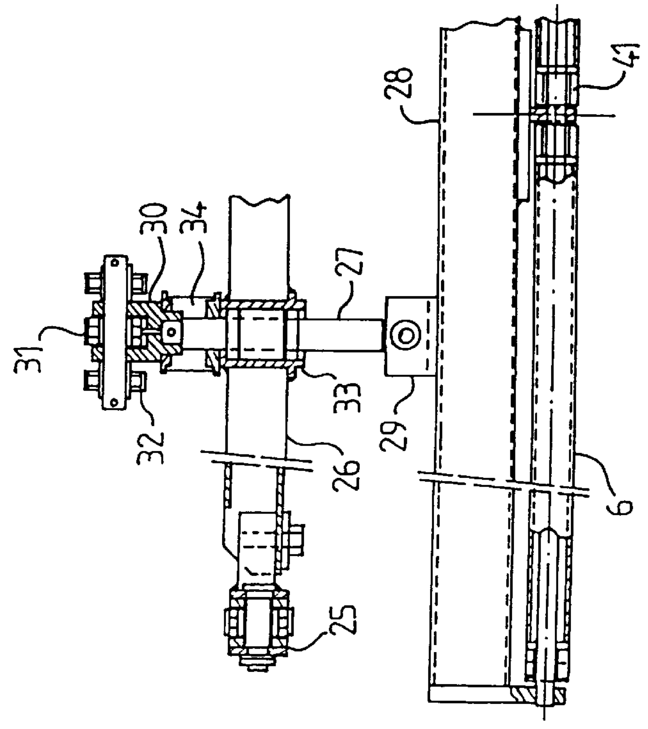
FIG. 3 is a partial view, in section along III—III in FIG. 2.

FIG. 3 illustrates in a more precise way how the corrugating bars are linked to the endless chain.

In order to be able to profile sheets of a large size, the corrugating bars are relatively long. This is why the endless chain is, preferably, made up of two members 25, linked by support bars 26.

The support 7 of each corrugating bar 6 on a support bar 26 comprises: at least one member 27 passing through a guide device 33 fixed to the bar 26, the member 27 being movable in translation with respect to the bar 26 and the guide device 33 and perpendicular to them, and a support system 28 for the corrugating bar 6, connected to the member 27 by suitable means 29.

The support system is necessary when the corrugating bar is relatively long.

Preferably in this case, a load recovery system 41 is also provided. A movable member 27 is then provided on each side of the load recovery system.

On the side opposite the corrugating bar 6, a clevis 30 that supports a member 31 between two bearings 32 is fixed on the movable member 27. The member 31 protrudes slightly with respect to the two bearings.

The clevis 30 is linked to the guide device 33 by elastic means 34, such as a spring.

Referring again to FIG. 2, the corrugating machine also comprises at least two cams 35, rotatably driven by a shaft 36. Each cam 35 comprises a plurality of projections 40. As many cams are provided as members 27 for a corrugating bar. The shaft 36 is carried by the frame 1 and driven by a motor, not represented on the figures.

Within the frame 1, a slide 37 is fixed comprising a first area 38 parallel to the plane of the dryer bars 13 and a second area askew, that is going away from this plane. As many slides are provided as cams.

The operation of the corrugating machine is then as follows:

The sheet 10 of material to be corrugated is supplied continuously and is positioned on the dryer bars 13 which also pass along continuously on the dryer chain 14.

A corrugating bar 6 is brought along by the endless chain 5 into the part 42 of the chain 5 where it is opposite the plane of the support bars. The support 7 of the corrugating bar is then perpendicular to the plane of the dryer bars 13. The corrugating bar is in the high position and is not in contact with the material to be corrugated. It then comes opposite a projection 40 of the cam, which presses on the member 31.

In the example illustrated in the Figures, this part 42 of the chain is parallel to the plane of the support bars and the corrugating bars are fixed orthogonally to the chain, but this example is not limitative. Other embodiments can be envisaged, in which the movement of the corrugating bars also occurs perpendicular to the plane of the support bars, in the part 42 of the chain.

Because of the rotation of the cain 35, the projection 40 pushes the movable member 27 of the corrugating bar support. The corrugating bar is then subjected to translation, perpendicular to the plane of the endless chain and to the plane of the support bars and is found in the low position.

The movement of the chain 5 of corrugating bars and that of the dryer chain 14 are regulated with respect to one another, in such a way that a corrugating bar is located in the low position between two dryer bars.

The movement of the clevis 30 compresses the elastic means 34 which are then in the position illustrated in FIG. 3.

Before the contact between the member 31 of the corrugating bar support and the projection 40 comes to an end because of the rotational movement of the cam 35, the running gear 32 comes into contact with the slide 37, the corrugating bar being carried by the endless chain 5 in the direction of travel of the material to be corrugated.

The corrugating bar 6 is then held in the low position so that the running gear 32 is in contact with the first area 38 of the slide, parallel to the plane of the dryer bars 13.

Then the running gear 22 is engaged in the second area 39 of the slide. At the exit from this second area, the corrugating bar 6 is once again in the high position.

The pressure on the member 31 being released, the spring 34, previously compressed, distends. The movable member 27 is then subjected to a translation movement which moves it away from the plane of the dryer bars 13. The movement causes the corrugating bar to go back up and it is then disengaged from the bars of the dryer between which it had gone.

The corrugating bar is then driven by the endless chain.

The positions of the cam 35 and the slide 37 are, preferably, chosen in a way that keeps the corrugating bars 6 in contact with the material to be corrugated, as long as the chain 5 is parallel to the plane of the dryer bars.

This allows easy retraction of the corrugating bars, the support of which is perpendicular to the plane of the dryer, while at the same time keeping the corrugating bars in contact with the material to be corrugated for a sufficiently long time to form the profile in a stable way and to reduce stresses.

The corrugating machine represented in FIG. 1 comprises, alternately, two corrugating bars 6 and a holding rod 22.

The holding rod is fixed to the endless chain 5 by a support 43 in such a way that it is in contact with the material to be corrugated without penetrating between the dryer bars.

The rod 22 allows one to prevent the material to be corrugated deforming, due to the driving in of the corrugating bars on either side of the holding bar. Hence the material 21 obtained has areas which are flat and not domed.

A material of different profile can be obtained by modifying the alternating corrugating bars and holding rods or by doing away with the holding rods.

The depth of the corrugations is set by positioning in an appropriate way the endless chain in relation to the bars of the dryer.

Finally, the corrugations obtained are not necessarily sinusoidal. By modifying the cross section of the corrugating bars, one may obtain Grecian type or V-shaped corrugations.

Figure 5:
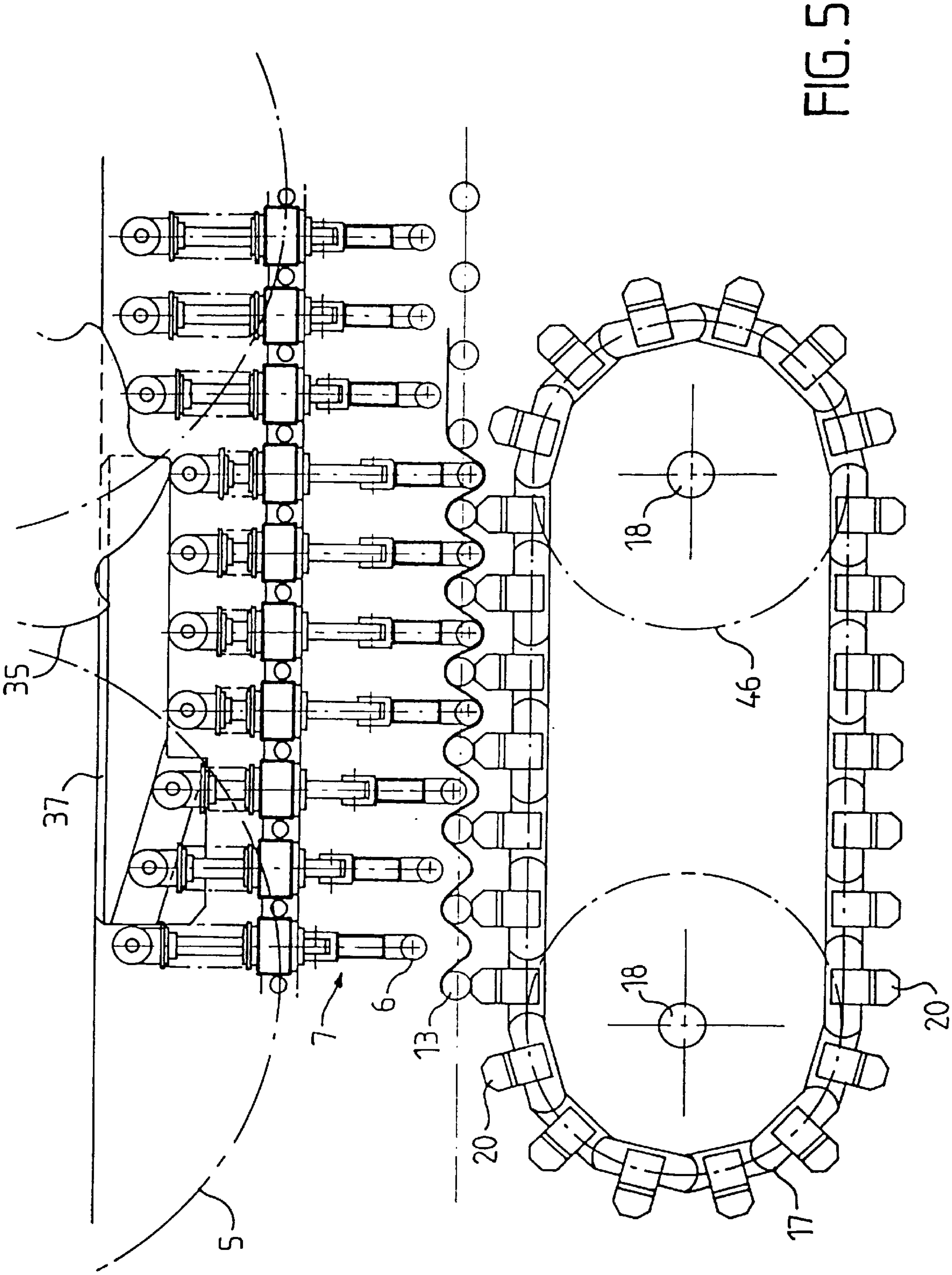

Referring to FIG. 5, a preferred embodiment of the corrugating machine according to the invention will now be described.

When the corrugated material is being shaped, the corrugating bars penetrate between the bars of the dryer and high loads are exerted on the dryer bars.

In order to prevent any deformation of the dryer bars and any long term deterioration of the machine, reinforcing bars 20 are provided.

These bars 20 are fixed onto the endless chain 17, rotatably driven by the shafts 18, by means of transmission units 46.

The endless chain 5 is synchronised with the dryer chain 14 in such a way that a supporting bar 20 comes into contact with a dryer bar 13, when it is in the area where the material is profiled. The supporting bar remains, preferably in contact with the dryer bar as long as the chain 5 of corrugating bars is parallel to the plane of the dryer bars and corrugating bars are therefore present between two dryer bars.

What is claimed is:

1. A corrugating machine comprising a plurality of corrugating bars fixed to an endless chain rotatably driven and a plurality of support bars for the material to be corrugated driven in translation, a part of the endless chain being opposite the plane of said support bars, the corrugating bars and the corresponding support bars interpenetrating one another, wherein the corrugating bars are movable in translation with respect to the endless chain, their movements being made approximately perpendicular to the plane of the support bars, when they are opposite said plane.

2. A corrugating machine according to claim 1, wherein it comprises a plurality of supporting bars for the support bars.

3. A corrugating machine according to claim 2, wherein the supporting bars are fixed to an endless chain positioned under the plane of the support bars and are rotatably driven.

4. A corrugating machine according to claim 1, wherein the support bars are the bars of a dryer chain.

5. A corrugating machine according to claim 1, wherein the corrugating bars are fixed orthogonally to the endless chain which is, in part, parallel to the plane of the support bars.

6. A corrugating machine according to claim 1, wherein it comprises, in the part of the chain opposite the plane of the support bars, means of moving the corrugating bars between a high position in which the bars are not in contact with the material to be corrugated and a low position, in which the bars penetrate between two support bars.

7. A corrugating machine according to claim 6, wherein said means are constituted by at least one cam which controls the movement of members linking the corrugating bars to the chain and movable in translation with respect to said chain.

8. A corrugating machine according to claim 6, wherein it comprises means for maintaining the corrugating bars in the low position, in the part of the chain opposite the plane of the support bars.

9. A machine according to claim 1, wherein it also comprises holding rods fixed to the chain alternately with corrugating bars.

10. A machine according to claim 1, wherein the cross section of the corrugating bars is matched to the profile sought for the corrugated material.

11. A machine according to claim 1, wherein the assembly of corrugating bars is movable with respect to the plane of the support bars and/or is interchangeable.

* * * * *